US011550812B2

(12) United States Patent
Liu et al.

(10) Patent No.: US 11,550,812 B2
(45) Date of Patent: Jan. 10, 2023

(54) PROCESSING A FEDERATED QUERY VIA DATA SERIALIZATION

(71) Applicant: International Business Machines Corporation, Armonk, NY (US)

(72) Inventors: Ping Liu, Beijing (CN); Lei Cui, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 18 days.

(21) Appl. No.: 17/181,788

(22) Filed: Feb. 22, 2021

(65) Prior Publication Data

US 2022/0269691 A1    Aug. 25, 2022

(51) Int. Cl.
*G06F 16/25* (2019.01)
*G06F 16/2453* (2019.01)
(Continued)

(52) U.S. Cl.
CPC .............. *G06F 16/256* (2019.01); *G06F 9/54* (2013.01); *G06F 16/2219* (2019.01); *G06F 16/24542* (2019.01); *G06F 16/258* (2019.01)

(58) Field of Classification Search
CPC ...... G06F 16/256; G06F 9/54; G06F 16/2219; G06F 16/24542; G06F 16/258
See application file for complete search history.

(56) References Cited

U.S. PATENT DOCUMENTS 5,634,053 A    5/1997  Noble et al.
6,356,946 B1   3/2002  Clegg et al.
(Continued)

FOREIGN PATENT DOCUMENTS

CN    101630322 B    4/2011

OTHER PUBLICATIONS

Yafooz, Wael.M.S. et al. FlexiDC: A Flexible Platform for Database Conversion. IEEE International Conference on Smart Computing and Electronic Enterprise (ICSCEE2018), Kuala Lumpur, Malaysia, Jul. 2018, pp. 196-202.
(Continued)

*Primary Examiner* — Dangelino N Gortayo
(74) *Attorney, Agent, or Firm* — The Steadman Law Firm PLLC

(57) ABSTRACT

Techniques are described with respect to processing a federated query. An associated computer-implemented method includes compiling a query received from a client computing system to generate a query statement and a query access plan. The query access plan incorporates a modified database access application programming interface (API) that supports data serialization. The method further includes executing the query access plan to transmit the query statement to a remote database system. The method further includes fetching a query result set from the remote database system including serialized binary large object (BLOB) data. The method further includes deserializing the serialized BLOB data of the query result set and populating an in-memory data structure with deserialized query results. In an embodiment, the method further includes transmitting the deserialized query results to the client computing system. In an additional embodiment, the method further includes generating query serialization capabilities for the remote database system.

20 Claims, 8 Drawing Sheets

(51) Int. Cl.
G06F 9/54 (2006.01)
G06F 16/22 (2019.01)

(56) References Cited

U.S. PATENT DOCUMENTS

| | | |
|---|---|---|
| 7,676,492 B2 | 3/2010 | Bodily et al. |
| 9,558,216 B2 | 1/2017 | Florendo et al. |
| 10,318,516 B1* | 6/2019 | Taylor ................... G06F 16/285 |
| 2009/0063453 A1 | 3/2009 | Adler et al. |
| 2013/0191523 A1* | 7/2013 | Buck ..................... G06F 9/5066 |
| | | 709/223 |
| 2016/0283140 A1* | 9/2016 | Kaushik ................ G06F 3/0643 |
| 2017/0249354 A1 | 8/2017 | Lee et al. |
| 2017/0364560 A1* | 12/2017 | Yi ........................ G06F 16/2219 |
| 2019/0188143 A1* | 6/2019 | Nguyen .............. G06F 9/44536 |
| 2020/0104387 A1* | 4/2020 | Sirajuddin .............. G06F 16/25 |
| 2021/0004488 A1* | 1/2021 | Lapushkin .......... H04L 63/0421 |

OTHER PUBLICATIONS

Data type mappings in a federated system. IBM Db2, Accessed Oct. 1, 2020. [2 printed pages] <https://www.ibm.com/support/producthub/db2/docs/content/SSEPGG_11.5.0/com.ibm.data.fluidquery.doc/topics/cfpdtm01.html>.

Lin, Eileen et al. IBM federated database technology. IBM Developer, Mar. 1, 2002, Updated Nov. 13, 2012. [15 printed pages] <https://www.ibm.com/developerworks/data/library/techarticle/0203haas/0203haas.html>.

* cited by examiner

PROCESSING A FEDERATED QUERY VIA DATA SERIALIZATION

BACKGROUND

The various embodiments described herein generally relate to query processing. More specifically, the various embodiments describe techniques of processing a federated query via data serialization.

SUMMARY

The various embodiments described herein provide federated query processing techniques. According to one or more embodiments, an associated computer-implemented method of processing a federated query via a federation server system includes compiling a query received from a client computing system to generate a query statement and a query access plan. The query access plan incorporates a modified database access application programming interface (API) that supports data serialization. The computer-implemented method further includes executing the query access plan to transmit the query statement to a remote database system. The computer-implemented method further includes fetching a query result set from the remote database system including serialized binary large object (BLOB) data. The computer-implemented method further includes deserializing the serialized BLOB data and populating an in-memory data structure with deserialized query results. The computer-implemented method further includes transmitting the deserialized query results to the client computing system. In an embodiment, the computer-implemented method further includes, responsive to determining that the query statement references a large object (LOB) query column, excluding the query statement from data serialization processing. In an additional embodiment, the computer-implemented method further includes facilitating generation of query serialization capabilities for the remote database system.

One or more additional embodiments pertain to a computer program product for processing a federated query via a federation server system, the computer program product including a computer readable storage medium having program instructions embodied therewith. According to such additional embodiment(s), the program instructions may be executable by at least one processor to cause the at least one processor to perform one or more steps of the above recited computer-implemented method. One or more further embodiments pertain to a federation server system having at least one processor and a memory storing an application program, which, when executed on the at least one processor, performs an operation including one or more steps of the above recited computer-implemented method.

According to one or more further embodiments, an associated computer-implemented method of processing a federated query via a remote database system includes integrating a serialization library received from a federation server system into a database image associated with the remote database system, the serialization library enabling query result format translation. The computer-implemented method further includes preparing a query result set by processing a query statement received from the federation server system. The computer-implemented method further includes transmitting the query result set to the federation server system via a modified database access API. In an embodiment, the computer-implemented method further includes placing the query result set into an output data buffer.

One or more further additional embodiments pertain to a computer program product for processing a federated query via a remote database system, the computer program product including a computer readable storage medium having program instructions embodied therewith. According to such further additional embodiment(s), the program instructions may be executable by at least one processor to cause the at least one processor to perform one or more steps of the above recited computer-implemented method. One or more further embodiments pertain to a remote database system having at least one processor and a memory storing an application program, which, when executed on the at least one processor, performs an operation including one or more steps of the above recited computer-implemented method.

BRIEF DESCRIPTION OF THE DRAWINGS

So that the manner in which the above recited aspects are attained and can be understood in detail, a more particular description of embodiments, briefly summarized above, may be had by reference to the appended drawings.

Note, however, that the appended drawings illustrate only typical embodiments of this invention and are therefore not to be considered limiting of its scope, for the invention may admit to other equally effective embodiments.

DETAILED DESCRIPTION

Figure 1:
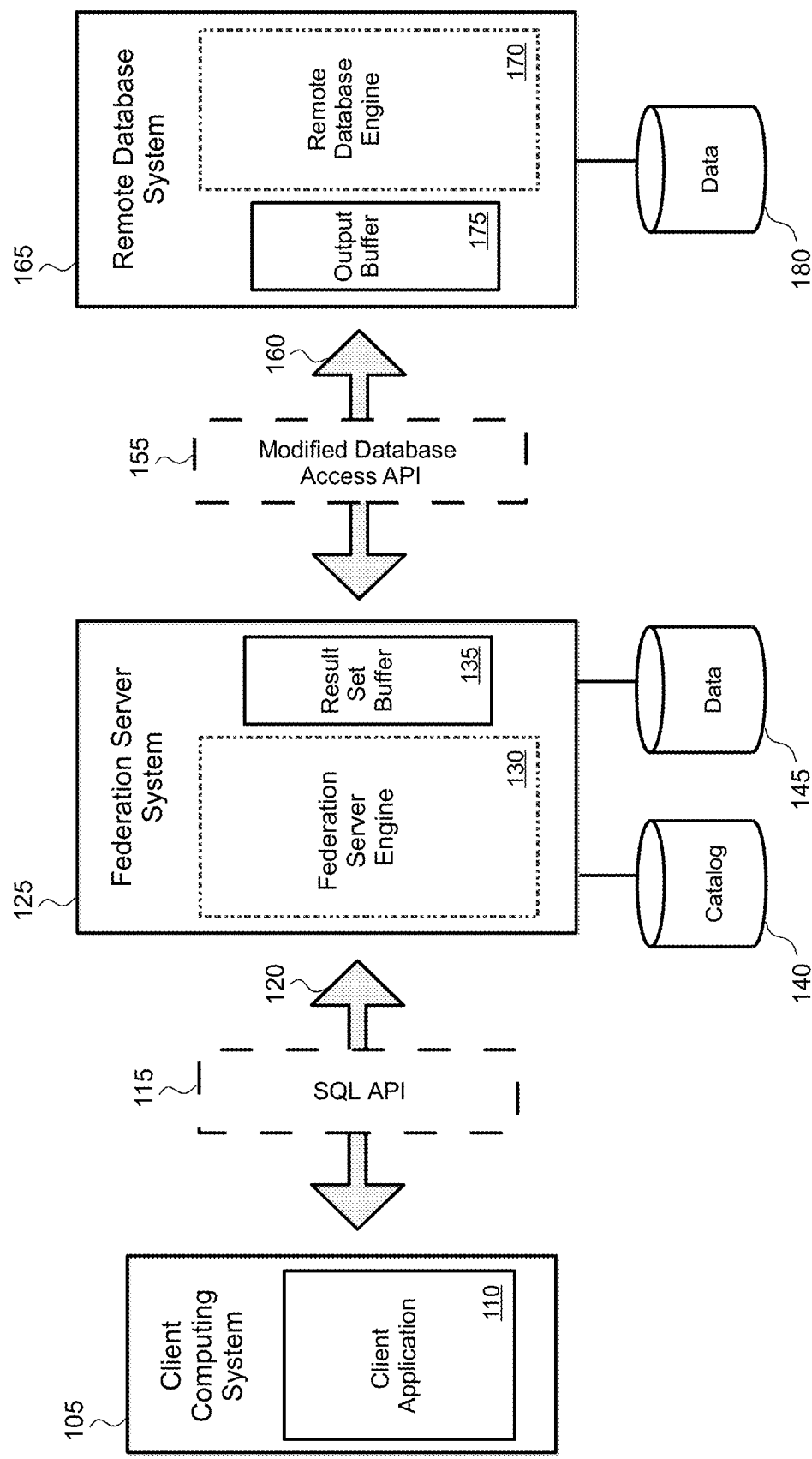
FIG. 1 illustrates a computing infrastructure, according to one or more embodiments.

The various embodiments described herein are directed to techniques of processing a federated query via data serialization. In the context of the various embodiments, data serialization is the process of translating a data structure or object state into a format that can be stored or transmitted and reconstructed later. Data deserialization is the process of reconstructing serialized data following storage and/or transmission. The various embodiments are described from the purview of both a federation server system and a remote database system. In the context of the various embodiments, a federation server system, also referred to as a data virtualization system, is a server system that enables interoperability among multiple data sources that may be decentralized but operatively connected via at least one network. Such federation server system enables use of a single SQL query format to access the multiple data sources via a remote database system or multiple remote database systems.

Accordingly, a client sending a SQL query to such federation server system may have collective access to the multiple data sources.

According to the various embodiments described herein, a client computing system may submit a query to a federation server system, the federation server system may transmit a query statement generated based upon the query to a remote database system through use of a modified database access application programming interface (API), the remote database system may obtain and serialize query results, the federation server system may fetch the serialized query results from the remote database system via the modified database access API, and the federation server system may deserialize and transmit the query results to the client computing system. Serialization, which occurs at the remote database system in accordance with the various embodiments, includes data conversion from respective data type format(s) associated with the remote database system to corresponding respective data type format(s) associated with the federation server system.

The various embodiments described herein may have advantages over conventional techniques. Remote data sources include various database types having various respective data formats. To process query results retrieved from remote data sources, conventional federated query processing requires data conversion in a federation server system. Since data conversion in a federation server system requires that data be copied multiple times, time and resource costs may be significant. The various embodiments may improve computer technology by moving data type conversion in the context of a federated query from a federation server system to a remote database system. Moreover, the various embodiments facilitate such data conversion by enabling serialization of query results into binary large object (BLOB) data in the remote database system. A BLOB is a data type that incorporates a collection of binary data as a single storage entity in the context of a database management system. Remote database system data conversion and serialization are enabled through use of a modified database access API, which facilitates transmission of a data type mapping from the federation server system to the remote database system and further facilitates transmission of serialized BLOB data to the federation server system. Additionally, the various embodiments enable deserialization of the serialized BLOB data directly into an in-memory data structure associated with the federation server system. Furthermore, the various embodiments are applicable in the context of any federated query request initiated via a client application. Some of the various embodiments may not include all such advantages, and such advantages are not necessarily required of all embodiments.

In the following, reference is made to various embodiments of the invention. However, it should be understood that the invention is not limited to specific described embodiments. Instead, any combination of the following features and elements, whether related to different embodiments or not, is contemplated to implement and practice the invention. Furthermore, although embodiments may achieve advantages over other possible solutions and/or over the prior art, whether or not a particular advantage is achieved by a given embodiment is not limiting. Thus, the following aspects, features, embodiments, and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions also may be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions also may be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Particular embodiments describe techniques relating to processing a federated query. However, it is to be understood that the techniques described herein may be adapted to a variety of purposes in addition to those specifically described herein. Accordingly, references to specific embodiments are included to be illustrative and not limiting.

FIG. 1 illustrates a computing infrastructure 100, according to one or more embodiments. As shown, computing infrastructure 100 includes a client computing system 105, a federation server system 125, and a remote database system 165. Although shown as a single computing system, client computing system 105 is included to be representative of a single client computing system or multiple respective client computing systems. In an embodiment, client computing system 105 is a thin client. Client computing system 105 optionally is, includes, or includes capabilities of a smartphone, a laptop, a desktop, and/or another hardware computing device configured to transmit and receive federated queries. One or more aspects of client computing system 105 are accessed or controlled by one or more clients. A client may be any entity capable of sending and/or receiving queries, e.g., an individual, a group of individuals, or an organization.

In an embodiment, federation server system 125 includes a single hardware server or a virtualized server associated with underlying hardware configured to provide hosting capabilities. In an alternative embodiment, federation server system 125 includes, and/or is otherwise operatively coupled to, a plurality of hardware servers and/or virtualized servers configured to provide hosting capabilities. In a further alternative embodiment, federation server system 125 is a cloud server system configured to provide distributed hosting capabilities via a plurality of cloud computing nodes in a cloud computing environment. According to such further alternative embodiment, each of the plurality of cloud computing nodes may be operatively coupled to one or more virtualized servers interfacing with underlying hardware, e.g., via a hypervisor. Moreover, according to such further alternative embodiment, the cloud computing nodes are configured to communicate with one another. Additionally, according to such further alternative embodiment, the cloud computing environment optionally offers infrastructure, platforms, and/or software as a service for which client computing system 105 or other systems associated with computing infrastructure 100 need not maintain resources locally.

Although shown as a single remote database system, remote database system 165 is included to be representative of a single remote database system (or a single remote data source more generally) or multiple respective database systems (and/or multiple remote data sources more generally). In an embodiment, remote database system 165 includes a single hardware server or a virtualized server associated with underlying hardware configured to provide hosting and/or remote data storage capabilities. In an alternative embodiment, remote database system 165 includes, and/or is otherwise operatively coupled to, a plurality of hardware and/or virtualized servers configured to provide hosting and/or remote data storage capabilities. In a further alternative embodiment, remote database system 165 is a cloud server system configured to provide distributed hosting and/or remote data storage capabilities via a plurality of cloud computing nodes in a cloud computing environment. According to such further alternative embodiment, each of the plurality of cloud computing nodes may be operatively coupled to one or more virtualized servers interfacing with underlying hardware, e.g., via a hypervisor. Additionally, according to such further alternative embodiment, the cloud computing nodes are configured to communicate with one another.

Client computing system 105 and federation server system 125 are communicatively coupled via a Structured Query Language (SQL) API 115 associated with network infrastructure 120. SQL API 115 facilitates transmission of a federated query from client computing system 105 to federation server system 125 and further facilitates transmission of query results (optionally deserialized query results) from federation server system 125 to client computing system 105. Network infrastructure 120 includes at least one network connection. Federation server system 125 and remote database system 165 are communicatively coupled via a modified database access API 155 associated with network infrastructure 160. Unlike a conventional database access API, modified database access API 155 enables data conversion at remote database system 165 via a data type mapping that associates respective remote database system data type formats with corresponding respective federation server system data type formats. Furthermore, unlike a conventional database access API, modified database access API 155 enables data serialization of query results. Modified database access API 155 facilitates transmission of a federated query statement from federation server system 125 to remote database system 165 and further facilitates transmission of query results (optionally serialized query results) from remote database system 165 to federation server system 125. Network infrastructure 160 includes at least one network connection.

Client computing system 105 includes a client application 110. Client application 110 is representative of a single client application or multiple respective client applications. Client application 110 is configured to transmit query requests (including federated query requests) and/or receive query results (including federated query results) via SQL API 115. Client application 110 optionally includes a graphical user interface (GUI), a command line interface, and/or a sensory interface (e.g., capable of discerning and processing client sound/voice commands). Client(s) may interact with such interface(s) via one or more client I/O devices. Client computing system 105 includes or otherwise is operatively coupled to physical hardware storage and physical hardware memory components, either directly and/or via one or more virtualized software components.

Federation server system 125 includes a federation server engine 130 and a result set buffer 135. Federation server engine 130 facilitates federated query processing according to the various embodiments described herein. In the context of the various embodiments, an engine is a collection of applications or a collection of respective application components within one or more applications. Specifically, federation server engine 130 is configured to receive a query from client computing system 105 via SQL API 115. Federation server engine 130 further is configured to transmit a translated query statement and query statement attributes, e.g., a query statement attribute set including a data type mapping, to remote database system 165 via modified database access API 155. Federation server engine 130 further is configured to receive query results (optionally serialized query results) from remote database system 165 via modified database access API 155. Federation server engine 130 further is configured to transmit query results (optionally deserialized query results) to client computing system 105. Result set buffer 135 is configured to store a query result set, e.g., a query result set received from remote database system 165. Federation server engine 130 is configured to fetch a query result set from remote database system 165 via modified database access API 155 for storage in result set buffer 135. Federation server system 125 is operatively or communicatively coupled to a catalog 140 and one or more data repositories 145. The one or more data repositories 145 include an in-memory data structure associated with federation server system 125. Catalog 140 includes metadata associated with the in-memory data structure. In the event that a query result set received from remote database system 165 and stored in result set buffer 135 is serialized, federation server engine 130 further is configured to deserialize the serialized query result set directly into the in-memory data structure. A federation server administrator or data steward optionally interacts with components of federation server system 125 via one or more server I/O devices.

Remote database system 165 includes a remote database engine 170 and an output buffer 175. In an embodiment, remote database system 165 is a relational database management system (RDBMS). In an alternative embodiment, remote database system 165 is a node in a distributed RDBMS environment, in which case remote database system 165 includes certain RDBMS aspects locally and is communicatively coupled to other remote database system nodes including other RDBMS aspects. Remote database engine 170 facilitates federated query processing according to the various embodiments described herein. Specifically, remote database engine 170 is configured to receive a translated query statement and query attributes, e.g., a query statement attribute set including a data type mapping, from federation server system 125 via modified database access API 155. Remote database engine 170 further is configured to transmit query results (optionally serialized query results) to federation server system 125 via modified database access API 155. Remote database system 165 is operatively or communicatively coupled to one or more remote data repositories 180. The one or more remote data repositories 180 include one or more remote databases and/or ontologies, from which remote database engine 170 obtains query result data. Output buffer 175 is configured to store a query result set obtained and processed by remote database engine 170. Remote database engine 170 is configured to facilitate transmission of a query result set stored in output buffer 175 to result set buffer 135 of federation server system 125 via modified database access API 155 in response to a fetch request received from federation server engine 130. A system administrator or data steward optionally interacts with components of remote database system 165 via one or more system I/O devices.

Figure 2:
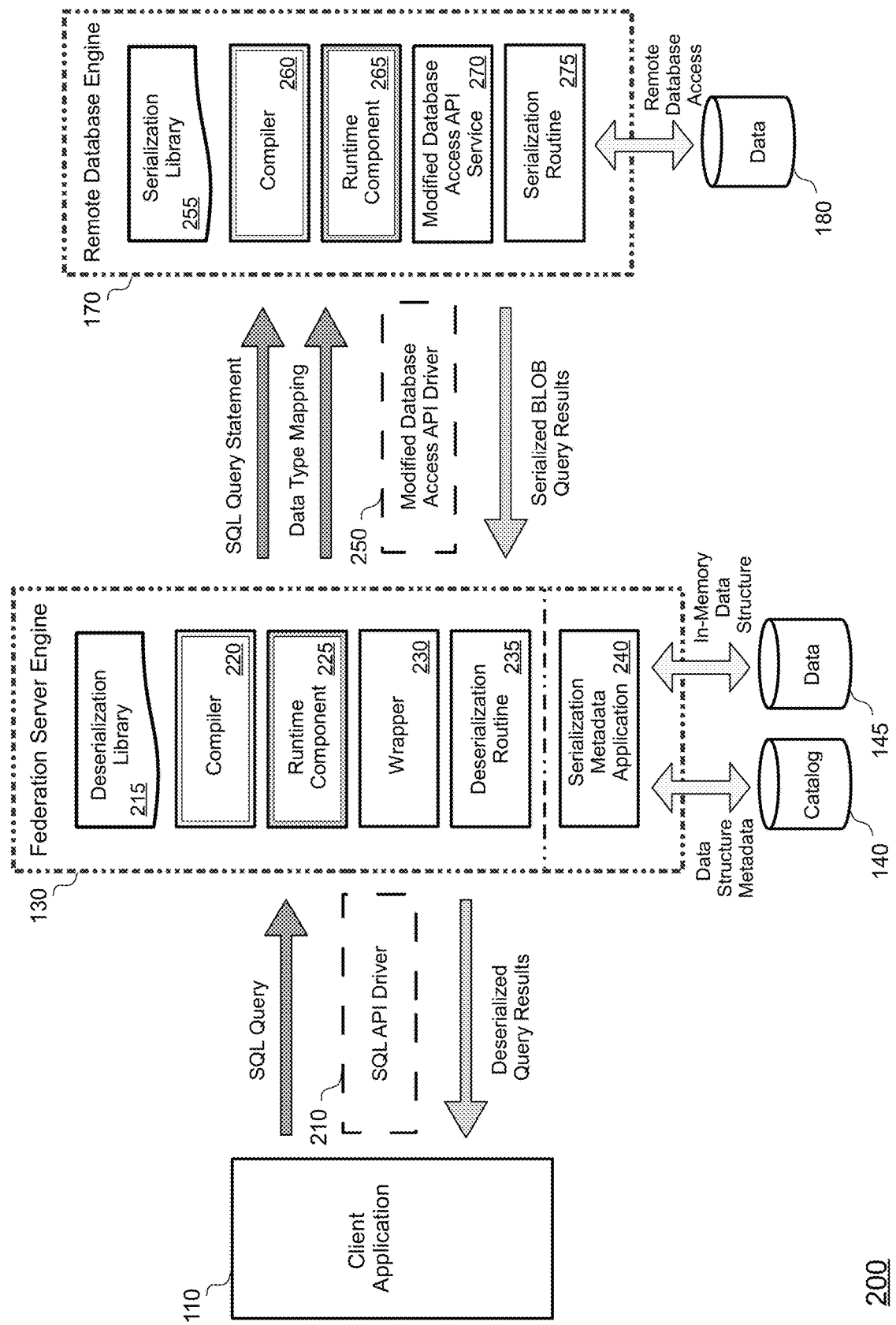
FIG. 2 illustrates a query processing architecture within the computing infrastructure of FIG. 1, according to one or more embodiments.

FIG. 2 illustrates query processing architecture 200 within computing infrastructure 100, according to one or more embodiments. As shown, client application 110 of client computing system 105 is configured to send a query, specifically an SQL query, to federation server engine 130 via SQL API driver 210. Client application 110 is further configured to receive query results, optionally deserialized, from federation server engine 130 via SQL API driver 210. Federation server engine 130 of federation server system 125 includes a deserialization library 215, a compiler 220, a runtime component 225, a wrapper 230, and a deserialization routine 235. A serialization metadata application 240 is operatively or communicatively coupled to other components of federation server engine 130. Compiler 220 is configured to compile the query received from client application 110 by translating the query into a query statement, specifically an SQL query statement, for transmission to remote database system 165. Compiler 220 further is configured to generate a federation server query access plan.

Runtime component 225 is configured to execute the federation server query access plan generated by compiler 220. Wrapper 230 is an interface between federation server engine 130 and remote database engine 170. Wrapper 230 is configured to prepare the query statement and a query statement attribute set (which may include a data type mapping) for transmission to remote database engine 170 and to facilitate transmission of the query statement and the query statement attribute set by interfacing with a modified database access API driver 250. Wrapper 230 further is configured to fetch query results, optionally deserialized in BLOB format, from remote database engine 170 via modified database access API driver 250. Serialization metadata application 240 is configured to generate in-memory data structure metadata for storage as one or more catalog entries within catalog 140. Federation server engine 130 is configured to store data to and retrieve data from the in-memory data structure within the one or more data repositories 145. Wrapper 230 further is configured to call deserialization routine 235 in order to deserialize, or facilitate deserialization of, a query result set received from remote database engine 170 directly into the in-memory data structure.

Remote database engine 170 of remote database system 165 includes a serialization library 255, a compiler 260, a runtime component 265, a modified database access API service 270, and a serialization routine 275. Modified database access API service 270 is configured to receive a query statement and a query statement attribute set, which may include a data type mapping for purposes of serialization, from wrapper 230 of federation server engine 130. Compiler 260 is configured to compile the query statement received from federation server engine 130 for remote database review and further is configured to create a remote database query access plan. Runtime component 265 is configured to execute the remote database query access plan, which includes database access instructions and other relevant data retrieval aspects. Based upon execution of the query access plan, remote database engine 170 is configured to interface with the one or more remote data repositories 180 to search query table(s) based upon the query statement received from federation server engine 130 in order to obtain query results. In the event that serialization of a query result set is required, modified database access API service 270 is configured to convert query result data based upon the data type mapping in the query statement attribute set received from federation server engine 130 and further is configured to call serialization routine 275 in order to serialize the converted data for transmission to federation server engine 130 via modified database access API driver 250.

One or more aspects of computing infrastructure 100, including client application 110 of client computing system 105, federation server engine 130 of federation server system 125, and/or remote database engine 170 of remote database system 165, are configured to provide appropriate client notice with respect to any personal data collection associated with federated query processing. One or more aspects of computing infrastructure 100 further are configured to provide a client an option to opt in or opt out of any such personal data collection at any time. Optionally, one or more aspects of computing infrastructure 100 further are configured to transmit at least one notification to any affected client each time any such personal data collection occurs.

Figure 3:
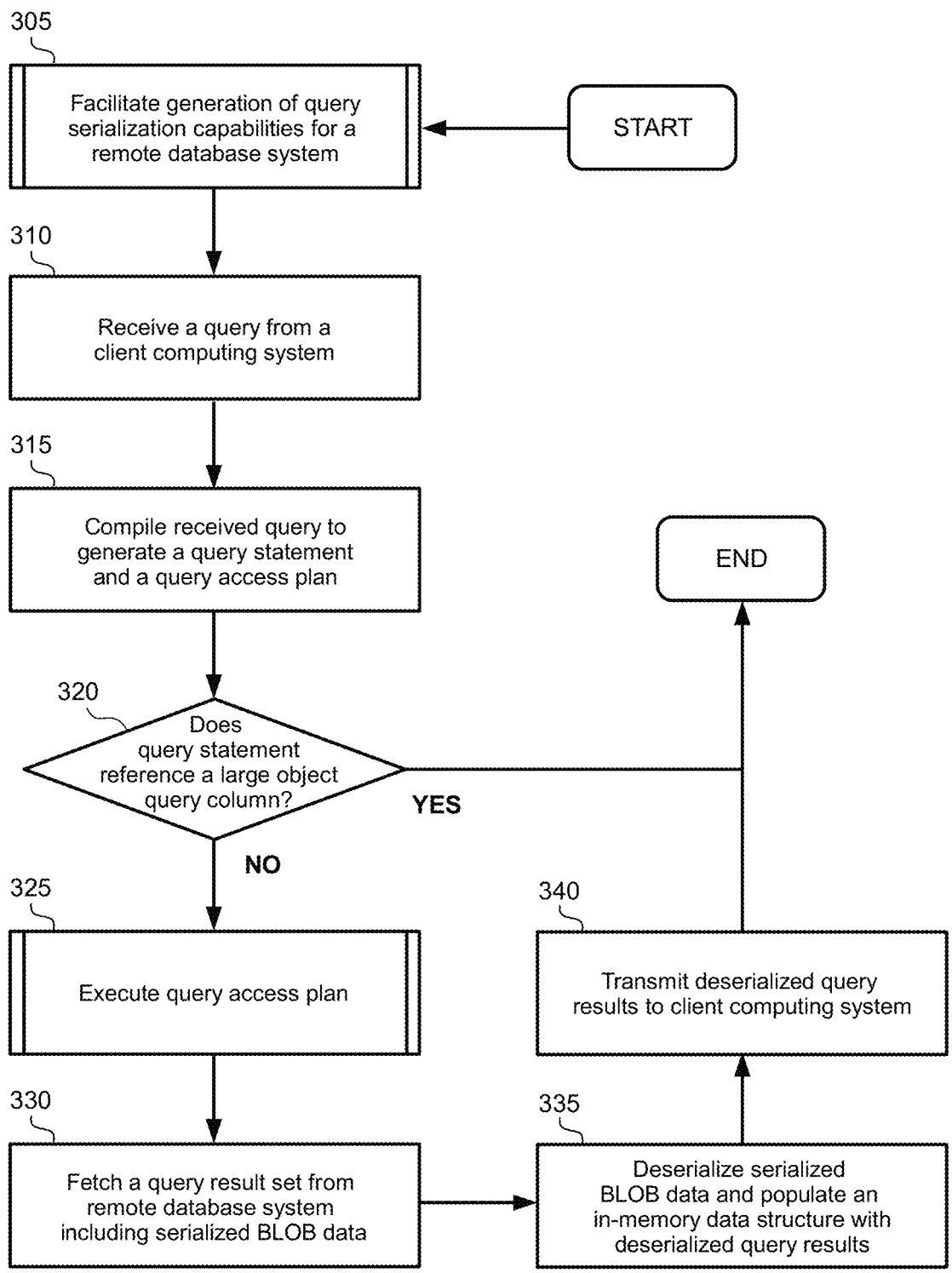
FIG. 3 illustrates a method of processing a federated query via a federation server system, according to one or more embodiments.

FIG. 3 illustrates a method 300 of processing a federated query via a federation server system (e.g., federation server system 125). One or more steps of the method 300 and associated methods described herein may be carried out in a client-server computing environment (e.g., computing infrastructure 100). A federation server engine (e.g., federation server engine 130) facilitates processing according to the method 300 and associated methods described herein. Additionally or alternatively to the client-server computing environment, one or more steps of the method 300 and associated methods described herein may be carried out fully or partially within one or more workloads of a cloud computing environment.

The method 300 begins at step 305, where the federation server engine facilitates generation of query serialization capabilities for a remote database system (e.g., remote database system 165). Query serialization enables the remote database system to obtain and process query results in accordance with the various embodiments. The federation server engine also facilitates generation of query deserialization capabilities corresponding to the query serialization capabilities, such that query results serialized at the remote database system may be deserialized by the federation server engine upon receipt. Generating query serialization capabilities includes creating both a serialization library and a deserialization library (e.g., serialization library 215 and deserialization library 255). The serialization library enables a serialization API, while the deserialization library enables a deserialization API. The deserialization API optionally is integrated into the federation server engine. A method with regard to facilitating generation of query serialization capabilities in accordance with step 305 is described herein with respect to FIG. 4. In an embodiment, the federation server engine facilitates generation of query serialization capabilities according to step 305 in a process separate from other steps of the method 300 and/or in an alternative order with respect to other steps of the method 300.

At step 310, the federation server engine receives a query, specifically an SQL query, from a client computing system (e.g., client computing system 105). Specifically, the federation server engine receives the query from a client application of the client computing system (e.g., client application 110). In an embodiment, the federation server engine receives the query from the client computing system via an SQL API driver associated with an SQL API (e.g., SQL API driver 210 associated with SQL API 115). At step 315, the federation server engine compiles the received query to generate a query statement, specifically an SQL query statement, and a query access plan. A compiler of the federation server engine (e.g., compiler 220) translates the query into the query statement, which is in a format compatible with the remote database system. In the context of the various embodiments, the federation server query access plan is a series of steps for interfacing with and accessing data from the remote database system. The federation server query access plan incorporates a modified database access API that supports data serialization (e.g., modified database access API 155). The modified database access API is an enhanced API that permits data conversion via a data type mapping at the remote database system and further permits data serialization consequent to such data conversion as described in the context of the various embodiments. In an embodiment, some or all aspects of the modified database access API, including certain driver aspects, are adapted from the Open Database Connectivity (ODBC) API, the Java Database Connectivity (JDBC) API, a native database access API, or a combination thereof. According to such embodiment, the modified database access API optionally is a modified ODBC API, a modified JDBC API, a modified native database access API, or a modified ODBC/JDBC API incorporating drivers and/or other aspects from both the ODBC API and the JDBC API. The modified database access API facilitates transmission of data type mapping information from the federation server engine to the remote database system, thus enabling data type format conversion necessary for data serialization. Such data conversion and data serialization capabilities are not supported by a conventional database access API. In a further embodiment, responsive to determining that the query received at step 310 is a complex query, the federation server engine optionally subdivides the complex query into respective subqueries and generates a query statement for each respective subquery based upon translation of the subquery. In the context of the various embodiments, a complex query is a query that requires searching based upon more than one parameter, i.e., based upon two or more criteria.

In an embodiment, the federation server engine compiler generates the query access plan according to step 315 based upon translation of the received query into the query statement. In an embodiment, the query access plan generated by the federation server engine compiler enables preparation of the query statement and related query statement attributes (e.g., a data type mapping) for transmission to the remote database system. Additionally or alternatively, the query access plan generated by the federation server engine compiler includes specific details with regard to data access retrieval technique at the remote database system. Details of the federation server query access plan are determined based upon elements of the query and/or based upon RDBMS capabilities of the remote database system. Accordingly, level of detail within the federation server query access plan may depend upon query elements and/or remote database system functionality. As further described herein, certain details of query access necessarily are determined at the remote database system, e.g., in the event that the query is a complex query requiring subdivision into respective subqueries.

At step 320, the federation server engine determines whether the query statement compiled at step 315 references a large object (LOB) query column. In the context of the various embodiments, large object data types (LOBs) are a set of data types configured to hold large amounts of data. In an embodiment, to prepare for execution of the query access plan, a runtime component of federation server engine (e.g., runtime component 225) determines whether the query statement references a LOB query column by iterating through query columns associated with the query statement. Responsive to determining that the query statement does not reference a LOB query column, the federation server engine proceeds to step 325. Responsive to determining that the query statement references a LOB query column, the federation server engine proceeds to the end of the method 300 and excludes the query statement from further federated query processing in accordance with the various embodiments described herein, thus excluding the query statement from data serialization processing. Accordingly, responsive to determining that the query statement references a LOB query column, the federation server engine does not utilize the modified database access API for purposes of data serialization. The federation server engine determines that the query statement references a LOB column responsive to determining that the query statement includes one or more elements that reference one or more LOB columns. In an embodiment, the federation server engine excludes the query statement from further federated query processing based upon a reference to a LOB column by reverting to conventional query processing, e.g., sending the query statement to the remote database system via a conventional database access API that does not support data serialization. The federation server engine reverts to a conventional query processing technique responsive to determining that a LOB column is present because in certain cases a serialized result column associated with a federated query result set that facilitates query result storage in BLOB format may be incapable of storing all data queried in reference to a LOB column.

At step 325, the federation server engine executes the federation server query access plan in order to transmit the query statement to the remote database system. The federation server engine runtime component executes the query access plan upon query compilation. In an embodiment, as further described herein, executing the query access plan includes calling the modified database access API to send the query statement and a retrieved data type mapping to the remote database system. Furthermore, in accordance with the query access plan, a wrapper of the federation server engine (e.g., wrapper 230) prepares the query statement for transmission to the remote database system via the modified database access API. A method with regard to executing the query access plan in accordance with step 325 is described herein with respect to FIG. 5.

At step 330, the federation server engine fetches via the modified database access API a query result set from the remote database system including serialized BLOB data. In an embodiment, the federation server engine fetches the query result set by calling a fetch routine associated with the modified database access API. In a further embodiment, the fetched serialized BLOB data is stored temporarily in a result set buffer (e.g., result set buffer 135). Whereas per conventional federated query processing the query result set includes a number of columns as determined by the query statement, per the serialization techniques in accordance with the various embodiments the query result set includes only one column of serialized BLOB data. Accordingly, the serialized query result set is organized by row, which facilitates relatively rapid and efficient data deserialization. Based upon the serialized query result set being organized by row, all columns of one result set row are stored in one BLOB object. Furthermore, the data within a serialized BLOB object fetched according to step 330 is already converted from one or more respective remote database data type formats to one or more corresponding respective federation server data type formats, since the remote database system completes all necessary data conversion using the data type mapping sent with the query statement via the modified database access API in accordance with step 325. Conversely, query result set data fetched via a conventional database access API, which is organized by column, would require more substantial data conversion processing, as each query result column would require data conversion at the federation server system from a respective remote database data type format to a corresponding respective federation server data type format.

At step 335, the federation server engine deserializes the serialized BLOB data of the query result set and populates an in-memory data structure associated with the federation server system with deserialized query results. The in-memory data structure is stored within or is otherwise operatively coupled to the federation server system (e.g., stored within one or more data repositories 145). The in-memory data structure is static, such that it is unmodified subsequent to federation server system startup. According to step 335, the federation server engine calls a deserialization routine (e.g., deserialization routine 235) as facilitated by a deserialization API provided by the deserialization library.

In an embodiment, the wrapper of the federation server engine facilitates execution of the deserialization routine. According to such embodiment, the federation server engine wrapper iterates through the query result set buffer row by row and calls the deserialization routine to deserialize the BLOB data to the in-memory data structure directly from the result set buffer. Rather than storing data to a file system, during deserialization the federation server engine wrapper populates the in-memory data structure only. Accordingly, the in-memory data structure directly receives a deserialized version of the fetched query result set consequent to deserialization of the serialized BLOB data at step 335. Since the BLOB data of the query result set is not copied to a file system upon deserialization but rather is moved directly from the result set buffer to the in-memory data structure, the process is relatively fast compared to data conversion and copy procedures required per conventional federated query processing. At step 340, the federation server engine transmits the deserialized query results to the client computing system. Subsequent to deserialization at step 335, the federation server engine runtime component aggregates deserialized results populated in the in-memory data structure for transmission to the client computing system. In an embodiment, the federation server engine formats the aggregated query results as requested or otherwise expected by the client computing system and sends the formatted query results to the client computing system via the SQL API driver.

Figure 4:
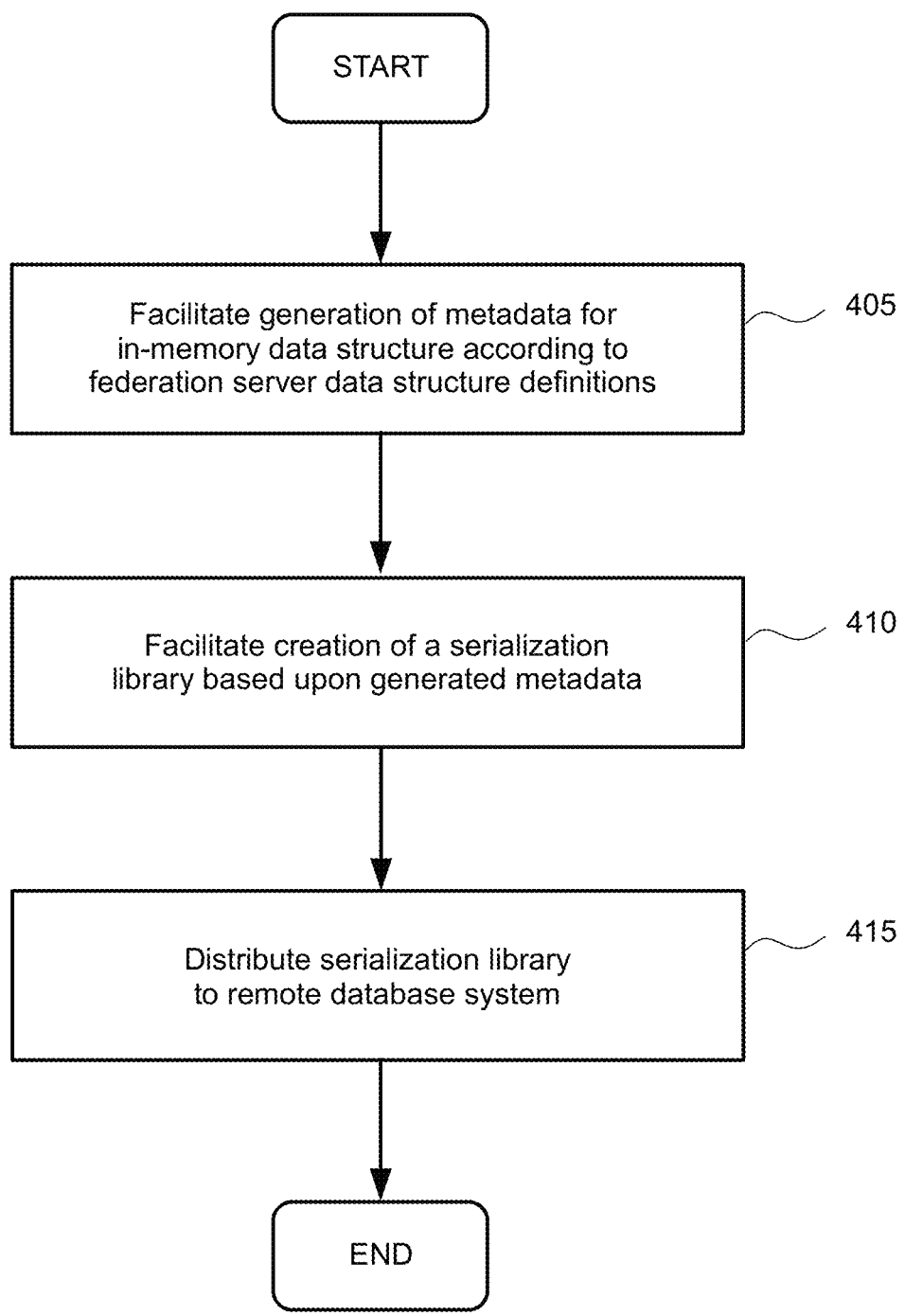
FIG. 4 illustrates a method of facilitating generation of query serialization capabilities for a remote database system, according to one or more embodiments.

FIG. 4 illustrates a method 400 of facilitating generation of query serialization capabilities for the remote database system. The method 400 provides one or more example embodiments with respect to step 305 of the method 300. The method 400 begins at step 405, where the federation server application facilitates generation of metadata for the in-memory data structure according to federation server data structure definitions. In an embodiment, a serialization metadata application associated with the federation server engine (e.g., serialization metadata application 240) generates the metadata. In an embodiment, the metadata is defined by interface description language (IDL) and is encoded in JavaScript Object Notation (JSON) format. According to such embodiment, JSON is the schema for the IDL code used to generate the metadata.

At step 410, the federation server application facilitates creation of a serialization library based upon the generated metadata. In an embodiment, the serialization metadata application associated with the federation server engine creates the serialization library. In a related embodiment, the serialization metadata application separately generates the serialization library including serialization code and the deserialization library including deserialization code. In an alternative related embodiment, the serialization library includes both serialization code and deserialization code corresponding to the serialization code. In a further embodiment, the federation server engine creates (or facilitates creation of) a deserialization interface using the deserialization code and integrates the deserialization interface into the federation server engine. At step 415, the federation server engine distributes (or facilitates distribution of) the serialization library to the remote database system. The serialization library is configured to enable the remote database system to serialize a query result set prior to transmission to the federation server system. The serialization library includes a serialization API to implement the serializer and to facilitate data serialization at the remote database system.

In sum, facilitating generation of query serialization capabilities for the remote database system according to the method 400 includes facilitating generation of metadata for the in-memory data structure according to federation server data structure definitions, facilitating creation of a serialization library based upon the generated metadata, and distributing the serialization library to the remote database system.

Figure 5:
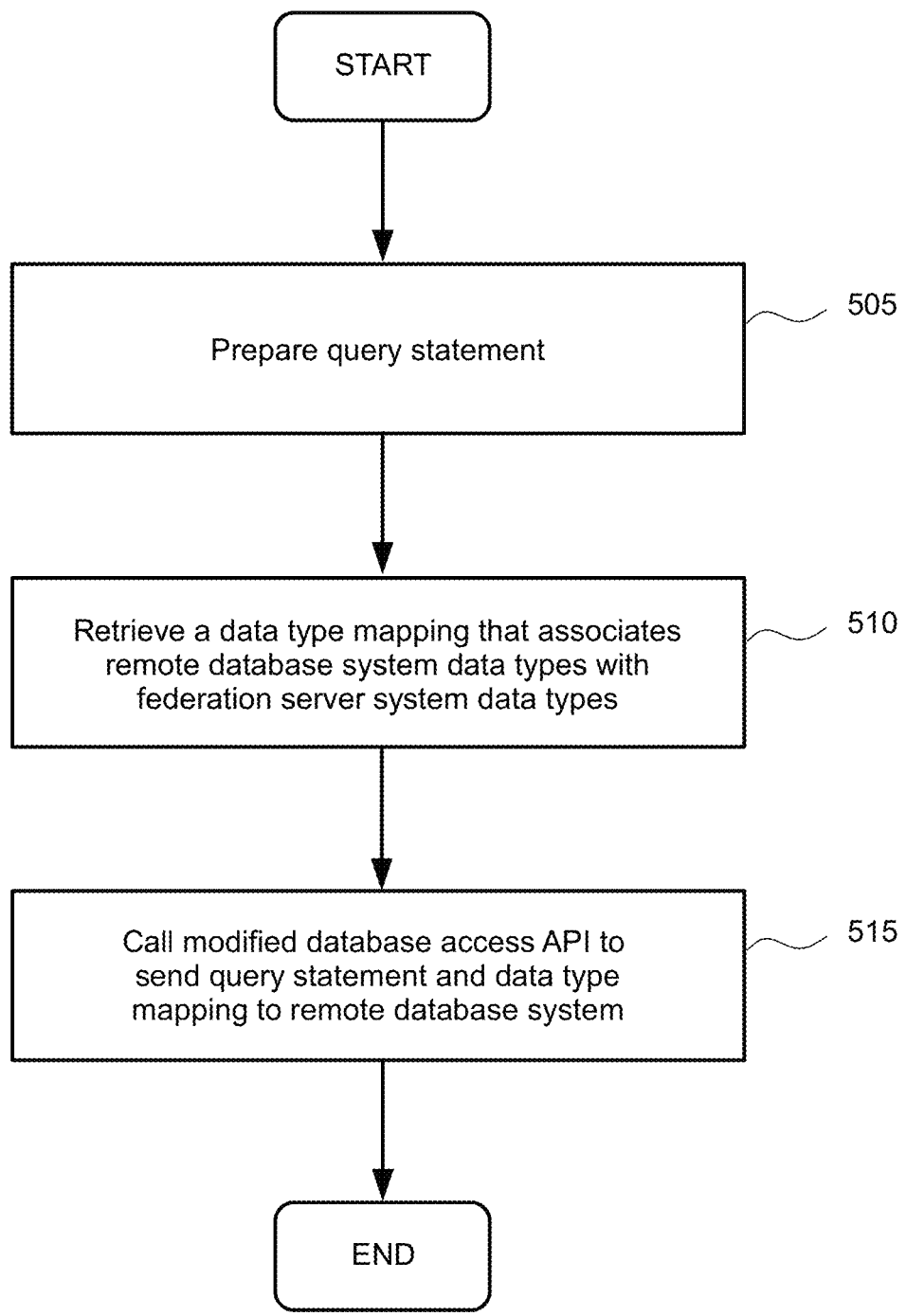
FIG. 5 illustrates a method of executing a query access plan, according to one or more embodiments.

FIG. 5 illustrates a method 500 of executing the query access plan. The method 500 provides one or more example embodiments with respect to step 325 of the method 300. The method 500 begins at step 505, where the federation server engine prepares the query statement. In an embodiment, the federation server engine processes received query data and prepares the query statement via the wrapper. In a further embodiment, the federation server engine wrapper calls a conventional database access API, e.g., ODBC/JDBC/native database access API, to prepare the query statement for transmission to the remote database system. At step 510, the federation server engine retrieves a data type mapping that associates remote database system data types with federation server system data types. Specifically, the data type mapping includes at least one data conversion definition for adapting respective remote database system data type formats to corresponding respective federation server system data type formats associated with the in-memory data structure. Accordingly, the data type mapping enables conversion of a query result set element from a respective remote database system data type format to a corresponding respective federation server system data type format for purposes of populating the in-memory data structure. In an embodiment, the data type mapping includes relationship information between respective query columns that are associated with the remote database system and corresponding respective query columns that are associated with the federation server system and compatible with the in-memory data structure. The data type mapping is not specific to a particular query or set of queries but rather is generally applicable. Furthermore, the data type mapping is predefined, since the table and column configuration associated with the remote database system is static and similarly the configuration of the in-memory data structure is static. Therefore, the federation server engine has sufficient information to configure and retrieve a data type mapping with respect to the remote database system irrespective of any received query. In a further embodiment, the federation server engine retrieves the data type mapping among in-memory data structure metadata stored within a catalog associated with the federation server system (e.g., catalog 140). As further described herein, the data type mapping is used exclusively for serialization. Therefore, the data type mapping is unnecessary in the context of remote database system processing if no serialization is performed by the remote database system. The federation server engine wrapper retrieves the data type mapping as well as any additional relevant query statement attributes in preparation for transmission of the query statement from the federation server system to the remote database system. In a further embodiment, the federation server engine configures the data type mapping to facilitate transmissibility to the remote database system, e.g., such as to ensure that only data relevant to query processing via the remote database system is identified for transmission.

At step 515, the federation server engine calls the modified database access API to send the query statement and the data type mapping to the remote database system. Specifically, the federation server engine wrapper calls the modified database access API in accordance with step 515. The federation server engine wrapper sends the data type mapping along with the query statement to the remote database system via a modified database access API driver (e.g., modified database access API driver 250). In an embodiment, the federation server engine wrapper sends the data type mapping according to step 515 as part of a query statement attribute set associated with the query statement. In addition to facilitating data type mapping at the remote database system, the modified database access API enables recognition of a single column query result set as opposed to a query result set including a same number of columns designated in the query statement. The single column query result set is configured to accommodate serialized BLOB data fetched from the remote database system at step 330. In an embodiment, the federation server engine wrapper uses the modified database access API only for sending the query statement and the data type mapping (optionally as part of a query statement attribute set) and for fetching results from the remote database system. According to such embodiment, as previously described in an embodiment with respect to step 505, the federation server engine wrapper calls a conventional database access API for preparing or creating the query statement rather than the modified database access API.

In sum, executing the query access plan according to the method 500 includes preparing the query statement, retrieving a data type mapping that associates remote database system data types with federation server system data types, and calling the modified database access API to send the query statement and the data type mapping to the remote database system.

Figure 6:
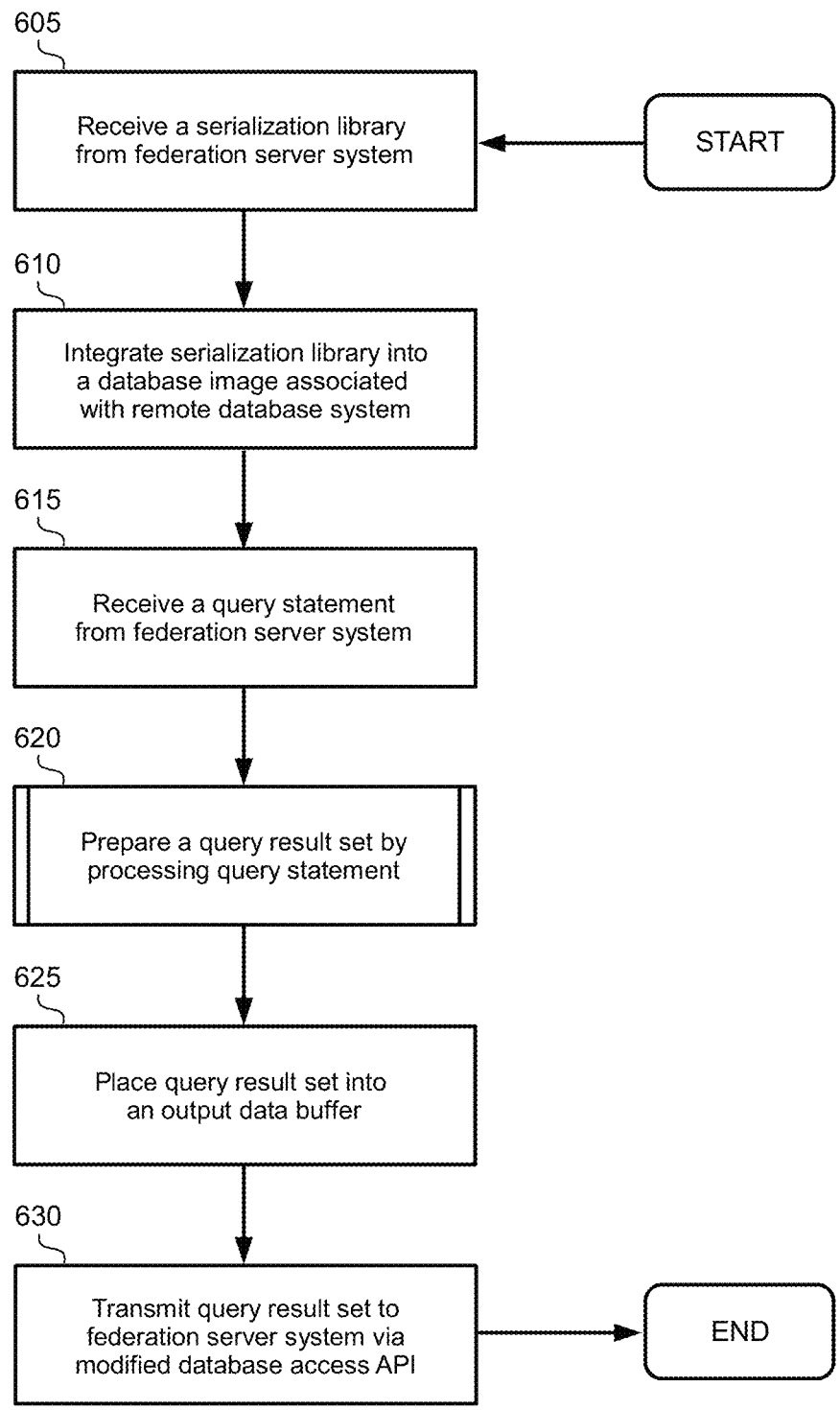
FIG. 6 illustrates a method of processing a federated query via a remote database system, according to one or more embodiments.

FIG. 6 illustrates a method 600 of processing a federated query via a remote database system (e.g., remote database system 165). One or more steps of the method 600 and associated methods described herein may be carried out in the client-server computing environment previously described with respect to the method 300 (e.g., computing infrastructure 100) or an analogous environment. A remote database engine (e.g., remote database engine 170) facilitates processing according to the method 600 and associated methods described herein. Additionally or alternatively to the client-server computing environment, one or more steps of the method 600 and associated methods described herein may be carried out fully or partially within one or more workloads of a cloud computing environment.

The method 600 begins at step 605, where the remote database engine receives a serialization library from a federation server system. In an embodiment, the federation server system from which the serialization library is received according to step 605 is the federation server system discussed in the context of the methods 300-500 (e.g., federation server system 125), in which case the serialization library received is the serialization library created at step 410. Additionally or alternatively, the remote database engine may interface with one or more other federation server systems in the context of the various embodiments. The remote database system interfaces with the federation server system via the modified database access API previously discussed with respect to federation server system processing in the context of the methods 300-500 (e.g., modified database access API 155). Specifically, the remote database engine is connectively coupled to the federation server engine of the federation server system (e.g., federation server engine 130) via the modified database access API driver previously discussed in the context of step 515 (e.g., modified database access API driver 250). The serialization library enables query result format translation to facilitate query result transmission from the remote database system to the federation server system.

At step 610, the remote database engine integrates the serialization library into a database image associated with the remote database system. In an embodiment, the remote database engine integrates the serialization API into, or otherwise provides serialization API access to, a modified database access API service of the remote database engine (e.g., modified database access API service 270). In the context of the various embodiments, an image of a database encompasses the structure and contents of the database. In an additional embodiment, the remote database engine creates (or facilitates creation of) a serialization interface using serialization code included in the serialization library and integrates the serialization interface into the modified database access API service. In a further embodiment, the remote database engine receives the serialization library and integrates the serialization library into the database image according to steps 605 and 610 in a process separate from other steps of the method 600 and/or in an alternative order with respect to other steps of the method 600.

At step 615, the remote database engine receives a query statement from the federation server system. In an embodiment, the query statement received at step 615 is a query statement generated by the federation server engine at step 315 and processed according to the methods 300-500. In a further embodiment, the query statement is accompanied by one or more attributes associated with the query statement, e.g., a data type mapping retrieved by the federation server engine at step 510. According to such further embodiment, the one or more attributes, including the data type mapping, may be part of a query statement attribute set sent by the federation server system. According to such embodiments, the modified database access API service of the remote database engine receives the query statement and the query statement attributes via the modified database access API driver. At step 620, the remote database engine prepares a query result set by processing the query statement. A method with regard to preparing the query result set by processing the query statement in accordance with step 620 is described herein with respect to FIG. 7.

At step 625, the remote database engine places the query result set into an output data buffer of the remote database system (e.g., output data buffer 175). At step 630, the remote database engine transmits the query result set to the federation server system via the modified database access API. According to step 630, in response to a fetch request sent by the federation server system, e.g., in the context of step 330, the modified database access API service of the remote database engine facilitates transmission of the query result set to the federation server system via the modified database access API driver. Furthermore, according to step 630, the output data buffer interfaces with a result set buffer of the federation server system, such as the result set buffer previously described in the context of step 330 (e.g., result set buffer 135). The result set buffer receives the query result set from the output data buffer, in the form of serialized query result datapoints if serialization is required.

Figure 7:
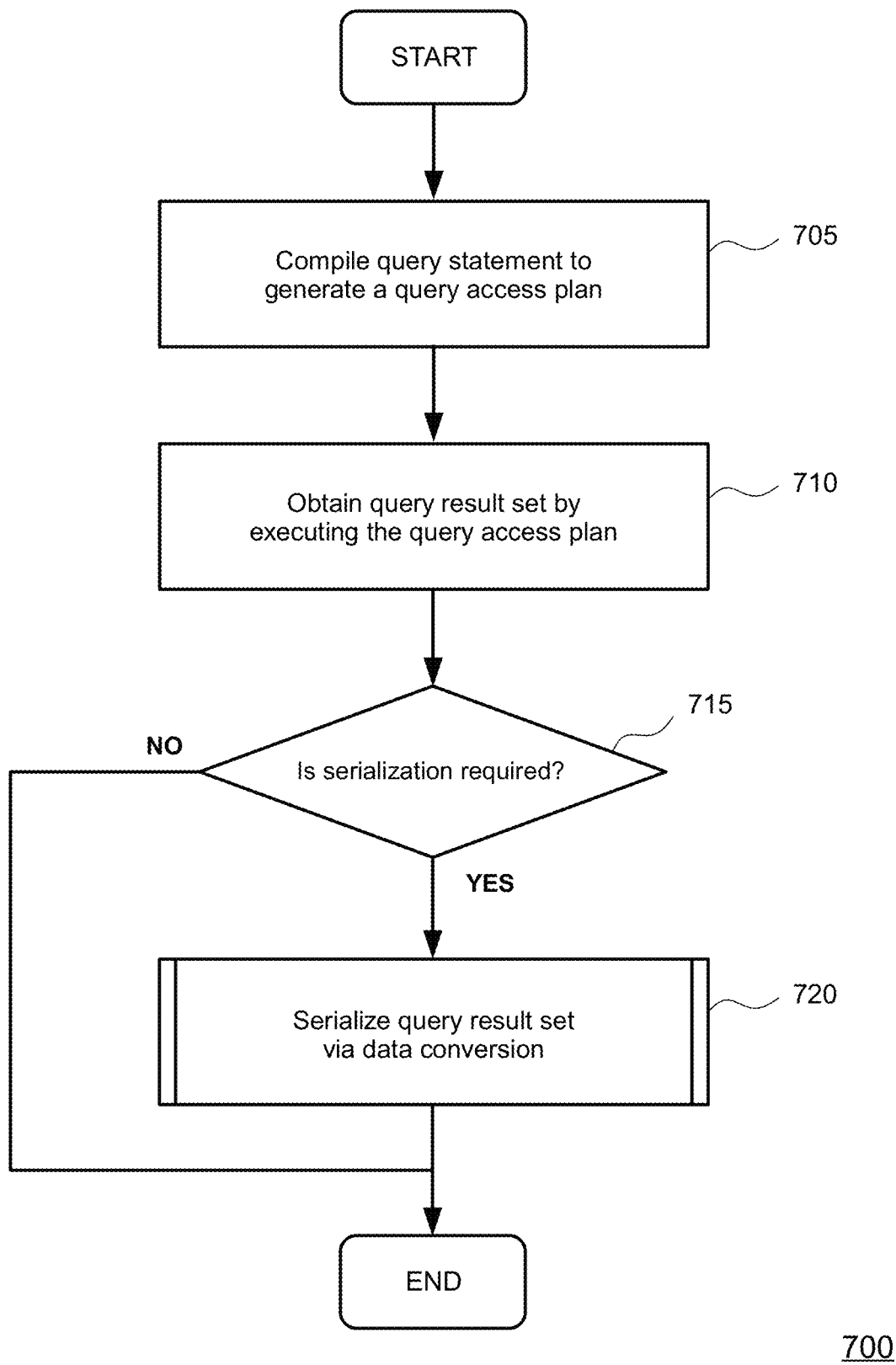
FIG. 7 illustrates a method of preparing a query result set by processing a query statement, according to one or more embodiments.

FIG. 7 illustrates a method 700 of preparing the query result set by processing the query statement. The method 700 provides one or more example embodiments with respect to step 620 of the method 600. The method 700 begins at step 705, where the remote database engine compiles the query statement to generate a query access plan. A compiler of the remote database engine (e.g., compiler 260) compiles the query statement at step 705. In an embodiment, in the context of compiling the query statement, the remote database engine compiler generates the remote database query access plan to establish a technique for scanning the remote database system table(s) and accessing remote database data. A remote database engine runtime component (e.g., runtime component 265) executes the remote database query access plan. While optionally details of remote database system access are designated in the query access plan generated and executed in the federation server system according to steps 315 and 325, certain details of query access necessarily are determined at the remote database system. For instance, in the event that the query received from the client computing system is a complex query, such complex query may require subdivision into subqueries at the federation server system, in which case only the RDBMS capabilities of the remote database engine would be capable of determining technique(s) for processing query statements created from respective subqueries of such complex query. Accordingly, responsive to determining that the query statement processed according to the method 700 is translated from a subquery of a complex query, the remote database engine generates the query access plan at step 705 by determining a remote database table access technique, e.g., a process of scanning the remote database table(s), based upon a parameter of the subquery.

At step 710, the remote database engine obtains the query result set by executing the query access plan. In an embodiment, the remote database engine runtime component executes the remote database query access plan. In an embodiment, executing the remote database query access plan includes scanning the target remote database table(s), aggregations, and/or filters based upon aspects of the compiled query statement. The remote database engine runtime component interfaces with one or more remote data repositories (e.g., one or more data repositories 180) in order to access the data and produce the query result set. In a further embodiment, the remote database engine runtime component interfaces with the one or more remote data repositories by executing one or more RDBMS database search functions and/or access functions. As further described herein, the modified database access API service converts and serializes the query result set for transmission to the federation server system via the modified database access API driver.

At step 715, the remote database engine determines whether serialization is required. The remote database engine, specifically the modified database access API service, determines whether serialization is required by reviewing attributes associated with the query statement, e.g., a query statement attribute set sent by the federation server system along with the query statement. In an embodiment, the modified database access API service determines that serialization is required based upon presence of a data type mapping among the query statement attributes. According to such embodiment, if such data type mapping exists, then serialization is required. Otherwise, serialization is not required. Certain federation server database clients may send queries that require serialization, in which case a data type mapping is sent among query statement attributes to the remote database system along with the query statement via the modified database access API. Conversely, other clients may send queries that do not require or permit serialization. Responsive to determining that serialization is not required, the remote database engine may proceed to the end of the method 700, in which case the remote database engine may proceed to place the query result set directly into the output data buffer in accordance with step 625 without further modification. Responsive to determining that serialization is required, at step 720 the remote database engine serializes the query result set via data conversion. The data conversion adapts one or more respective data type formats associated with the remote database system to one or more corresponding respective data type formats associated with the federation server system. In an embodiment, the remote database engine executes serialization steps via the modified database access API service. A method with regard to serializing the query result set according to step 720 is described herein with respect to FIG. 8.

In sum, preparing the query result set by processing the query statement according to the method 700 includes compiling the query statement to generate a query access plan, obtaining the query result set by executing the query access plan, and determining whether serialization is required by reviewing attributes associated with the query statement. Additionally, preparing the query result set according to the method 700 includes, responsive to determining that serialization is required, serializing the query result set via data conversion.

Figure 8:
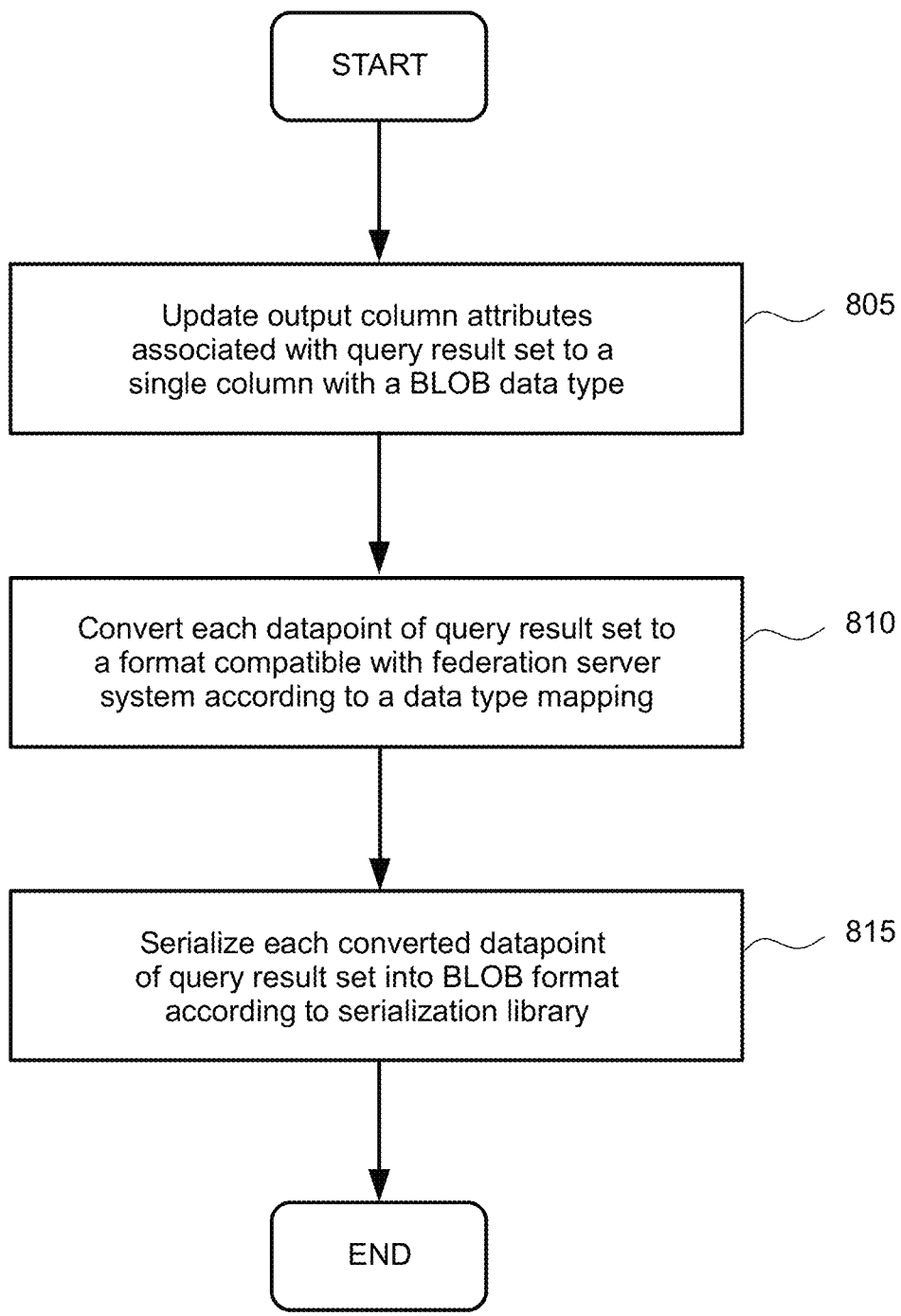
FIG. 8 illustrates a method of serializing a query result set via data conversion, according to one or more embodiments.

FIG. 8 illustrates a method 800 of serializing the query result set via data conversion. The method 800 provides one or more example embodiments with respect to step 720 of the method 700. The method 800 begins at step 805, where the remote database engine updates output column attributes associated with the query result set to a single column with a BLOB data type. In an embodiment, the modified database access API service of the remote database engine performs the update. For instance, given a query statement requesting five return columns, the modified database access API service updates the output column attributes to one BLOB return column. The remote database engine performs such update to ensure that the output column attributes may accommodate serialization of the query result set into BLOB format as further described below.

At step 810, the remote database engine converts each datapoint of the query result set to a format compatible with the federation server system according to a data type mapping among query statement attributes provided by the federation server system, e.g., the data type mapping retrieved according to step 510 and sent to the remote database system according to step 515. In an embodiment, the modified database access API service of the remote database engine performs the data conversion. The data type mapping permits the modified database access API service to convert each datapoint of the query result set from a respective remote database system data type format to a corresponding respective federation server system data type format acceptable for populating the in-memory data structure associated with the federation server system. In a further embodiment, the modified database access API service of the remote database engine converts each datapoint of the query result set according to the data type mapping by converting data of each query result column associated with the query result set from a respective remote database system data type format to a corresponding respective federation server system data type format. For instance, given a data type mapping entry that associates a "SQL_CHAR" remote database system data type with a corresponding "VARCHAR" federation server system data type, the modified database access API service converts data formatted in accordance with the "SQL_CHAR" data type to a data format in accordance with the "VARCHAR" data type. Accordingly, any data associated with a "SQL_CHAR" remote database query result column may be represented in a "VARCHAR" federation server query result column for purposes of populating the in-memory data structure. The data conversion is achieved without modifying the schema of the remote database system, i.e., without modifying data columns and/or table(s) associated with the remote database system. The only schema aspect needed to complete the data conversion is the data type mapping. Furthermore, the data conversion within the remote database system according to the data type mapping is the only data conversion in the context of fulfilling the federated query request. Conversely, since a conventional database access API is incapable of providing the remote database system data type mapping information necessary to convert the query result set to federation server system data type format(s), conventional federated query processing requires multiple data conversions. Specifically, during conventional federated query processing, within the remote database system at least one data conversion is required to convert query results from remote database table format(s) to format(s) compatible with the conventional database access API. Additionally, during conventional federated query processing, further data conversion is required within the federation server system in order to convert the query results sent in format(s) compatible with the conventional database access API to format(s) compatible with the federation server system.

At step 815, the remote database engine serializes each converted datapoint of the query result set into BLOB format according to the serialization library. In an embodiment, the modified database access API service of the remote database engine calls a serialization routine (e.g., serialization routine 275) as facilitated by a serialization API provided by the serialization library integrated into the remote database system engine at step 610. Upon serialization, the format of the query result set is translated to be organized by row, and all columns of one row are stored in one BLOB object. Specifically, all datapoints associated with query columns of one row are stored in one BLOB object. In the context of executing the query access plan generated by the remote database engine compiler and subsequently converting and serializing datapoints of the obtained query result set, the remote database engine runtime component obtains results for respective elements of the query statement, and, responsive to determining that serialization is required, the modified database access API service converts the respective result elements according to the data type mapping and serializes the converted result elements into BLOB format for transmission to the federation server system.

In sum, serializing the query result set via data conversion according to the method 800 includes updating output column attributes associated with the query result set to a single column with a BLOB data type, converting each datapoint of the query result set to a format compatible with the federation server system according to a data type mapping provided by the federation server system, and serializing each converted datapoint of the query result set into BLOB format according to the serialization library.

The descriptions of the various embodiments of the present invention have been presented for purposes of illustration but are not intended to be exhaustive or limited to the embodiments disclosed. All kinds of modifications made to the described embodiments and equivalent arrangements should fall within the protected scope of the invention. Hence, the scope of the invention should be explained most widely according to the claims that follow in connection with the detailed description and should cover all possibly equivalent variations and equivalent arrangements. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method of processing a federated query via a federation server system, the method comprising:
    compiling a query received from a client computing system to generate a query statement and a query access plan, wherein the query access plan incorporates a modified database access application programming interface (API) that supports data serialization;
    executing the query access plan by calling the modified database access API to send the query statement and a data type mapping to a remote database system, wherein the data type mapping includes at least one data conversion definition for adapting respective remote database system data type formats to corresponding respective federation server system data type formats;
    fetching from the remote database system a query result set including serialized binary large object (BLOB) data compatible with the federation server system; and
    deserializing the serialized BLOB data and populating an in-memory data structure with deserialized query results.

2. The computer-implemented method of claim 1, further comprising:
    transmitting the deserialized query results to the client computing system.

3. The computer-implemented method of claim 1, further comprising:
    responsive to determining that the query statement references a large object (LOB) query column, excluding the query statement from data serialization processing.

4. The computer-implemented method of claim 1, further comprising:
    facilitating generation of query serialization capabilities for the remote database system.

5. The computer-implemented method of claim 4, wherein facilitating generation of query serialization capabilities for the remote database system comprises:
    facilitating generation of metadata for the in-memory data structure according to federation server data structure definitions;
    facilitating creation of a serialization library based upon the generated metadata; and
    distributing the serialization library to the remote database system.

6. The computer-implemented method of claim 1, wherein executing the query access plan comprises:
    preparing the query statement; and
    retrieving the data type mapping.

7. A computer-implemented method of processing a federated query via a remote database system, the method comprising:
    integrating a serialization library received from a federation server system into a database image associated with the remote database system, the serialization library enabling query result format translation;
    preparing a query result set by processing a query statement received from the federation server system, wherein preparing the query result set comprises serializing the query result set by converting each set datapoint to a format compatible with the federation server system according to a data type mapping provided by the federation server system; and transmitting the query result set to the federation server system via a modified database access API.

8. The computer-implemented method of claim 7, further comprising:

placing the query result set into an output data buffer.

9. The computer-implemented method of claim 7, wherein preparing the query result set comprises:

compiling the query statement to generate a query access plan; and obtaining the query result set by executing the query access plan.

10. The computer-implemented method of claim 9, wherein generating the query access plan comprises, responsive to determining that the query statement is translated from a subquery of a complex query, determining a remote database table access technique based upon a parameter of the subquery.

11. The computer-implemented method of claim 7, wherein serializing the query result set comprises:

updating output column attributes associated with the query result set to a single column with a BLOB data type; and serializing each converted set datapoint into BLOB format according to the serialization library.

12. The computer-implemented method of claim 7, wherein converting each set datapoint comprises converting data of each query result set column from a respective remote database system data type format to a corresponding respective federation server system data type format.

13. The computer-implemented method of claim 7, wherein upon serialization the query result set is organized by row.

14. The computer-implemented method of claim 7, wherein upon serialization all columns of one row of the query result set are stored in one BLOB object.

15. A computer program product for processing a federated query via a federation server system, the computer program product comprising a computer readable storage medium having program instructions embodied therewith, the program instructions executable by at least one processor to cause the at least one processor to:

compile a query received from a client computing system to generate a query statement and a query access plan, wherein the query access plan incorporates a modified database access API that supports data serialization;

execute the query access plan by calling the modified database access API to send the query statement and a data type mapping to a remote database system, wherein the data type mapping includes at least one data conversion definition for adapting respective remote database system data type formats to corresponding respective federation server system data type formats;

fetch from the remote database system a query result set including serialized BLOB data compatible with the federation server system; and deserialize the serialized BLOB data and populate an in-memory data structure with deserialized query results.

16. The computer program product of claim 15, wherein the program instructions further cause the at least one processor to:

transmit the deserialized query results to the client computing system.

17. The computer program product of claim 15, wherein the program instructions further cause the at least one processor to:

responsive to determining that the query statement references a LOB query column, exclude the query statement from data serialization processing.

18. The computer program product of claim 15, wherein the program instructions further cause the at least one processor to:

facilitate generation of query serialization capabilities for the remote database system.

19. The computer program product of claim 18, wherein facilitating generation of query serialization capabilities for the remote database system comprises:

facilitating generation of metadata for the in-memory data structure according to federation server data structure definitions;

facilitating creation of a serialization library based upon the generated metadata; and distributing the serialization library to the remote database system.

20. The computer program product of claim 15, wherein executing the query access plan comprises:

preparing the query statement; and retrieving the data type mapping.

\* \* \* \* \*